N. V. HYBINETTE.
ELECTROLYTIC PROCESS FOR THE EXTRACTION OF COPPER.
APPLICATION FILED MAY 22, 1913.
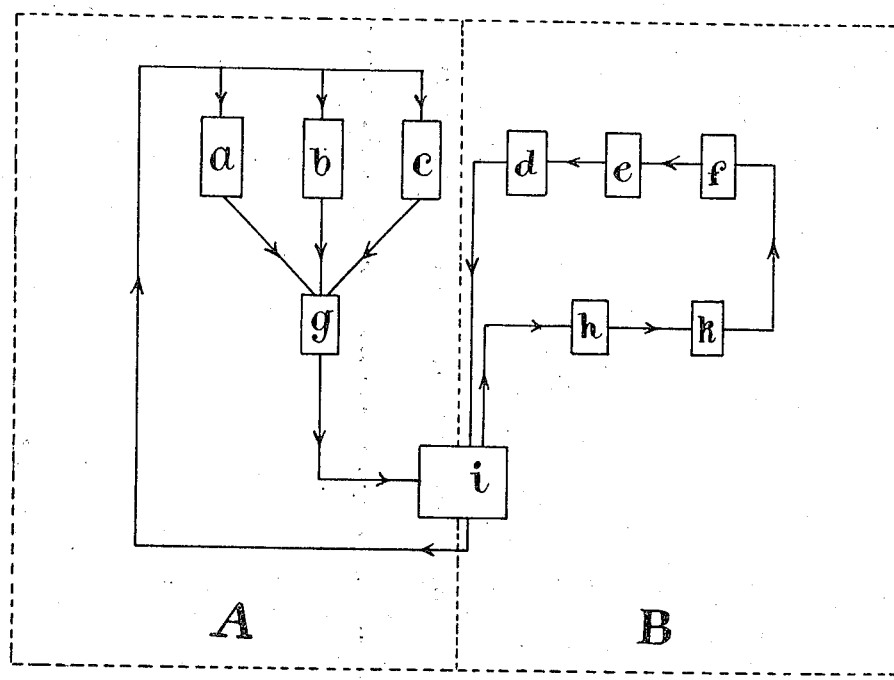

UNITED STATES PATENT OFFICE.

NOAK VICTOR HYBINETTE, OF CHRISTIANIA, NORWAY.

ELECTROLYTIC PROCESS FOR THE EXTRACTION OF COPPER.

1,136,424.  Specification of Letters Patent.  Patented Apr. 20, 1915.

Application filed May 22, 1913. Serial No. 769,208.

*To all whom it may concern:*

Be it known that I, NOAK VICTOR HYBINETTE, a subject of the King of Norway, residing at Christiania, Norway, have invented certain new and useful Improvements in Electrolytic Processes for the Extraction of Copper; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to processes, where a roasted or natural copper ore containing that metal partly in the shape of oxid and partly as sulfid, is leached with a solution containing ferric sulfate of iron and free acid, whereby the copper is extracted and the resulting solution electrolyzed and again used for leaching. I have found, that such natural oxy-sulfid ores generally, and roasted ores always, contain the sulfid copper in two different forms, one which is easily dissolved in a diluted and cold ferric sulfate solution and another compound, which is only soluble in a much more concentrated and warmer solution of ferric sulphate. If for instance an ore mainly consisting of 4% copper as chalcopyrite, some iron pyrites and the remainder mostly quartz is roasted to a point, where there is still left insoluble in weak sulfuric acid about 1.5% copper, this copper is almost all soluble in a solution containing 35 gr. Fe per liter as ferric sulfate, if acted upon at a temperature of above 60° C. A solution of 10–15 gr. Fe as ferric sulfate will dissolve only about one half of this copper, when acting at ordinary temperature and very little more when the temperature is increased. I have also found, that such roasted ores contain compounds, and probably FeO or FeS which reduce ferric sulfate to a much greater extent, than what corresponds to the amount of Cus or $Cu_2S$, soluble in the ferric solution and that such compounds are all oxidized by a diluted ferric sulfate solution at ordinary temperature.

Upon these peculiar properties I have now based the process, which is the subject of this application.

This process may for instance be carried out as follows: The partly roasted material or natural oxy-sulfid ore is subjected to leaching with a solution of weak sulfuric acid and ferric sulfate at ordinary temperature. The solution is then electrolyzed in cells containing lead anodes, but no diaphragms or other special arrangements whatever. A continual circulation of the solution is kept up through the leaching tanks, then to the electrolytic cells and back to the leaching tanks over and over. The speed of circulation is regulated in such a way, that no more ferric iron is formed in the electrolysis, than can be tolerated to obtain a fair copper plating with a fair expenditure of power. This limit is about 10–15 gr. ferric iron. This circulation can go on, until the ore is exhausted of reducing compounds, and if the roasting has been carried out right, the copper contents is at the same time reduced to the quantity, which remains as $Cu_2S$, and which is only soluble in stronger and warmer ferric iron solution. I provide such stronger solution by electrolyzing some of my ordinary solution in cells with diaphragms until it becomes oxidized to the necessary extent, and I continue my leaching with this stronger solution under application of heat until so little copper remains in the residue, that further extraction is unprofitable. I shall call this first leaching and electrolysis section A and the leaching with stronger solution and electrolysis in cells with diaphragms section B. Theoretically it would be best to keep these two sections entirely separate but this is impossible in practice because it would involve the washing out of the ore and drying of the same between the two treatments. The solution in section B is therefore taken from section A, oxidized by the use of cells with diaphragms and heated with the ore and after having been used to extract the last of the copper from the ore, it is used to expel the solution from section A in the ore previous to the treatment with the hot strong ferric solution. It is at the same time reduced and cooled and mixed with the solution it has expelled and arrives therefore after having passed through several tanks in succession back to the condition of section A.

In the accompanying drawing which is a diagrammatic view a, b, c, d, e, f indicate leaching tanks, of which one is filled each day. f is the oldest and a is the new filled one, *g* is the electrolytic cell without diaphragm and *h* the cell with diaphragm.

*i* is the storage tank, and *k* is the tank for heating the solution.

Tanks *a*, *b* and *c* are in section A, and their contents are leached with a solution containing about 60 gr. iron out of which only 10-15 gr. are present as ferric iron. This solution contains also 20 gr. copper and 45 gr. free acid. After leaching the solution holds about 2 gr. Fe as ferric sulfate 58 gr. Fe as ferrous sulfate 30 gr. copper and 30 gr. free sulfuric acid. By passing through *g* the solution is again changed to its first composition. In section B the solution from *i* is oxidized in the electrolytic copper plating cell with diaphragm *h* and thereby changed to about the following composition: 40 gr. Fe as ferric sulfate, 20 gr. Fe as ferrous sulfate, 25 gr. copper as sulfate, 15 gr. free sulfuric acid.

When the solution has just passed from sec. A into sec. B it contains then a certain quantity of solution from sec. A amounting to from 10% to 30% of the weight of the ore depending upon the ability of the ore to retain moisture. The solution coming from *e* is partly reduced and partly mixed with section A solution, dispelled from *e* and *f*. By passing through *d* it is further cooled and reduced so as to be nearly like the solution from *g*, when it gets back to the storage tank *i*. The material in *f* is in the last stage of extraction; the solution from section A has been expelled by the ore having passed through the stages *d* and *e*, and it has also been preheated in these stages, so that it is in condition to receive the full benefit of the strong and hot solution, coming from *h* and *k*.

It is evident that this process can be varied in many ways, as

What I claim is:

The process of electrolytically extracting copper from material containing the copper partly as oxid and partly as sulfid, which consists in leaching said material with an acid sulfate solution containing a large quantity of iron, of which only a small quantity is oxidized to the ferric state, electrolyzing the resulting solution while maintaining unrestricted diffusion between anolyte and catholyte and interrupting the said electrolysis before sufficient iron has been oxidized to ferric sulfate to seriously retard the deposition of copper, leaching fresh quantities of the ore with the resulting electrolyte to reduce the ferric salts and repeating such leaching and electrolysis until substantially all oxid of copper and substantially all sulfid of copper, easily soluble in a weak solution of ferric sulfate, are removed, and removing the remaining sulfid of copper by leaching with a stronger ferric sulfate solution, and electrolyzing the resulting solution while maintaining a restricted diffusion between anolyte and catholyte.

In testimony that I claim the foregoing as my invention, I have signed my name in presence of two subscribing witnesses.

NOAK VICTOR HYBINETTE.

Witnesses:
 M. E. GUSSORMSEN,
 RUTH LINDSTRÖM.